Feb. 20, 1940.   W. H. CAROTHERS   2,191,367
LAMINATED PRODUCT
Filed Feb. 15, 1937
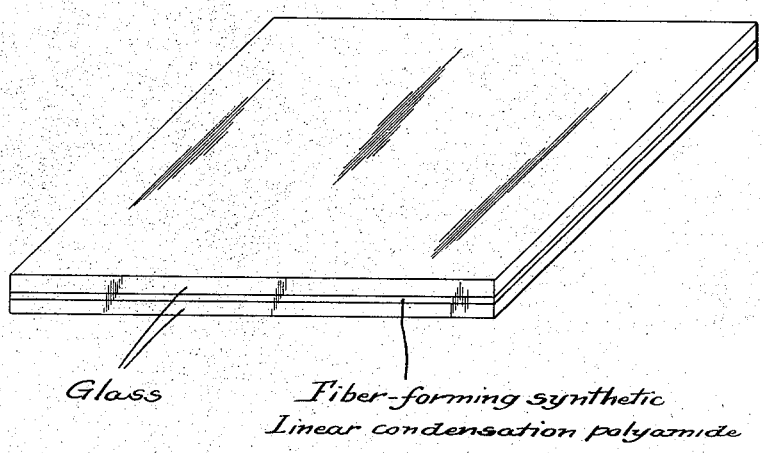
Glass   Fiber-forming synthetic
Linear condensation polyamide
Wallace H. Carothers  INVENTOR.
BY R. F. Miller
ATTORNEY.

Patented Feb. 20, 1940

2,191,367

UNITED STATES PATENT OFFICE 2,191,367

LAMINATED PRODUCT

Wallace H. Carothers, Wilmington, Del., assignor to E. I. du Point de Nemours & Company, Wilmington, Del., a corporation of Delaware Application February 15, 1937, Serial No. 125,888

14 Claims. (Cl. 49—92)

This invention relates to laminated articles and more particularly to so-called "safety-glass" or laminated glass.

This application is a continuation in part of my Patent 2,071,250.

An object of this invention is to provide a new and improved type of laminated article. A further object is to prepare laminated glass in which the laminae are united by means of a film or layer of great strength and durability. A still further object is to provide methods for making laminated glass wherein the interlayer comprises a polymer of the type described in the above mentioned application. Other objects will appear hereinafter.

These objects are accomplished by uniting two or more laminae by means of a layer comprising a synthetic linear condensation polymer having an intrinsic viscosity above 0.4. More particularly the invention comprises laminated glass composed of two sheets of glass united by a layer of a fiber-forming synthetic linear condensation polyamide or composed of two sheets of glass with an interlayer of a plastic material, the sheets being united by interposed layers of a polyamide of the aforesaid type. In another form the laminated glass may be composed of a single sheet of glass united to a reinforcing sheet of a suitable plastic material, such as a cellulose derivative, by means of a film or layer of a synthetic fiber-forming polyamide.

The synthetic linear condensation polymers uniting the laminae of the preferred products of this invention are described in the above mentioned patent. These polymers, which are derived from bifunctional reactants, are characterized by the fact that they can be formed into films and filaments which yield oriented products on application of stress herein referred to as "cold drawing." The oriented products furnish fiber diffraction patterns on examination with X-rays and exhibit birefringence and parallel extinction when observed under crossed Nicol prisms. Of these polymers, the polyamides have the most valuable properties for the preparation of fibers, films, sheets, ribbons, etc. Synthetic linear condensation polyamides are of two types, those derived from polymerizable monoaminomonocarboxylic acids and their amide-forming derivatives (ester, acid halide, anhydride, and amide) and those derived from the reaction of suitable diamines with suitable dicarboxylic acids or amide-forming derivatives of dibasic carboxylic acids. A convenient method for making polyamides of the diamine-dibasic acid type is to heat the diamine-dibasic acid salt under polymerizing conditions, generally 180–300° C. The polyamides can be formed under suitable conditions into continuous films or layers of great strength, toughness, and durability.

The present invention consists in the application of the above mentioned linear condensation polymers in the preparation of laminated articles, particularly laminated glass. Since the polyamides have been found to be exceptionally useful for this purpose, the invention will be described with particular reference to these polymers. It has been found that synthetic linear condensation polyamides can be made to form a very strong and permanent bond with glass and that the laminated article so formed is substantially unaffected by changes in temperature and humidity which such articles encounter in service. Furthermore, the laminated glass is very good in resistance to the commonly applied break and crush tests and in this respect is not sensitive to wide variations in temperature. In other words, it is shatterproof. Depending on the use to which the laminated article is to be put the interlayer may be transparent, translucent, or opaque.

Before describing the invention in detail, further reference should be made to the properties of the synthetic linear condensation polyamides. While the properties of the polyamides will of course vary somewhat with the reactants used in their preparation and with the extent to which they have been polymerized (i. e., their molecular weight), common characteristics of shaped polyamide articles are great strength, good thermal and light stability, good water resistance, and good aging qualities. As already indicated, films, filaments, and the like prepared from the preferred polyamides are further characterized by the fact that they yield oriented products on cold drawing; in general, cold drawing improves the toughness, elasticity, and utility of the articles. The most useful polyamides for the purpose of this invention have melting points ranging from 100 to 300° C.

Since the polyamides can be melted without substantial decomposition, it is possible to form films, sheets, and the like directly from the molten polymer. Films prepared in this manner are generally opaque, however, unless they are formed, as described in application Serial Number 125,926, filed of even date herewith by G. D. Graves, by rapid chilling of the molten polymer, e. g., by extruding the polymer in sheet form into a suitable quenching liquid, such as water. This rapid chilling or "tempering" also leads to a tougher product. For the most part, polyamides derived from a straight chain (polymethylene) monoaminomonocarboxylic acid or from the reaction of a straight chain diamine with a straight chain dicarboxylic acid are relatively insoluble in the more common organic solvents, but are soluble in phenols and usually in the lower members of the fatty acid series, such as formic and acetic. Films can be prepared by flowing solutions of the polyamides on a suitable surface, e. g., glass, and evaporating the solvent or by regenerating the polyamide in film or sheet form by extruding a solution of the polyamides through a slit orifice or between rolls into a suitable coagulating bath. Films obtained by these methods are also generally opaque, but these films may be made transparent by the process described in Patent 2,141,169. This method consists in flowing the films from solutions of the polyamide containing from a few percent to 75% or more of hydrogen chloride followed by heat treatment at approximately 100° C. A suitable solution for this purpose is prepared by adding a methanol solution of hydrogen chloride to a formic acid solution of the polyamide.

Certain types of polyamides are soluble in a wider variety of solvents than the polyamides mentioned above. Thus, polyamides prepared from diamines and dicarboxylic acids one or both of which contain a hydrocarbon substituent (side chain) in the chain of atoms separating the amide-forming groups are soluble in alcohols. For example, the polyamides derived from hexamethylenediamine and alpha- and/beta-methyl adipic acid, for example, the mixed acids obtained by oxidation of hydrogenated cresols, are soluble in alcohols, e. g., methanol and butanol. This is also true of polyamides derived from dibasic acids and diamines such as 3-methylhexamethylenediamine. Polyamides of this type have less tendency to yield opaque films than those prepared from unsubstituted polyamide-forming reactants, e. g., the polyamide derived from hexamethylenediamine and adipic acid (polyhexamethylene adipamide). Another class of polyamides which is soluble in a wider range of solvents and which exhibits a greater tendency to form clear films are the so-called interpolymers or copolymers, i. e., polyamides derived from a mixture of polyamide-forming reactants capable of yielding more than one polyamide if reacted in suitable combinations. As examples of such interpolymers might be mentioned polyamides derived from a mixture of diamines with one or more dicarboxylic acids. Thus, the polyamide derived from a mixture of one mol of hexamethylenediamine, one mol of decamethylenediamine, one mol of sebacic acid, and one mol of adipic acid is soluble in hot ethanol and butanol and yields fairly clear films from such solutions even without the use of hydrogen chloride, whereas the separate polyamides derived from hexamethylenediamine and adipic acid and from decamethylenediamine and sebacic acid are insoluble in these solvents and yield clear films only under special conditions. The interpolymers are further characterized by the fact that their melting points are not so sharp as those of the straight polyamides and are considerably lower than those of the corresponding straight polyamides. These properties; namely, solubility in cheap low boiling solvents and a tendency to form clear films, make these polyamides particularly useful in the preparation of laminated glass.

Reference has been made to the degree of polymerization of polyamides. In general, the strength and film properties of the polyamides improve with increase in molecular weight. Although the exact molecular weights of the polyamides cannot be determined with certainty, viscosity measurements furnish a useful means for comparing the molecular weights of different polymers. As a rule, polyamides do not exhibit satisfactory film-forming or fiber-forming properties until their intrinsic viscosity is at least 0.4, where intrinsic viscosity is defined as $$\frac{\log_e \eta_r}{C}$$

where $\eta_r$ is the viscosity of a dilute meta-cresol solution of the polyamide divided by the viscosity of meta-cresol in the same units and at the same temperature and C is the concentration in grams of polyamide per 100 cc. of solution. The most useful films are prepared from polyamides having an intrinsic viscosity above 0.6, 0.8 to 2.0 being a very useful range. In general, this is true also of other types of synthetic linear condensation polymers.

The laminated articles of this invention can be prepared in a number of ways. The invention will be described with particular reference to the preparation of laminated glass since this represents an important type of laminated article. A convenient method for preparing polyamide laminated glass consists in placing a layer or sheet of the synthetic polyamide between two plates of glass and then pressing the plates together under the influence of heat and pressure. Although the thickness of the layer may be varied within wide limits depending upon the type of product desired, for most purposes layers of 0.001 to 0.05 inch thickness are most desirable. The temperature employed for this purpose should preferably be close to the softening point of the polyamide. After adhesion has been effected, the article is cooled and if the polyamide has a marked tendency toward crystallization, the cooling should be done rapidly. Although adhesives are not generally required, their use is not precluded. Still another method consists in flowing a solution of the polyamide on the glass plate, evaporating the solvent or at least the major portion thereof, and then applying the other plate of glass. Other methods known to the art may also be employed.

In the accompanying drawing the single figure is a perspective view of a form of my invention.

The safety glass shown in the drawing consists of two laminae of glass adhesively joined by a film of synthetic linear condensation polyamide which is more particularly described hereinafter.

The following examples in which parts are by weight illustrate the invention more specifically:

*Example I*

A uniform layer of approximately .02 inch thickness made from an interpolymer of intrinsic viscosity 1.05 prepared from equimolecular quantities of hexamethylene diammonium adipate (salt derived from hexamethylenediamine and adipic acid) and decamethylene diammonium sebacate was placed on a clean glass plate and heated to 165° C. to cause it to soften. Another hot glass plate was then placed on the first plate and pressure was applied so that the polyamide formed an adherent interlayer of uniform thickness. The section of laminated glass thus formed was transparent but slightly hazy.

When the laminated article was struck a sharp blow with a hammer, a number of radial cracks were formed but the section remained in one piece and still had considerable strength.

Example II

A homogeneous mixture obtained by heating together equal parts of an interpolymer of the type described in Example I and diphenylolpropane (plasticizer) was pressed between preheated clean glass plates at 110° C. so that a uniform adherent interlayer 0.02 inch in thickness was formed. The whole was then rapidly cooled by means of a current of cold air. The laminated glass thus obtained was more transparent than that described in Example I and was suitable for use as safety glass. When struck a sharp blow with a hammer it did not shatter.

Example III

Transparent films were prepared by spreading a hot 25% solution of a polyamide of intrinsic viscosity 1.12, derived from hexamethylenediamine and the mixed dibasic acids derived from the oxidation of hydrogenated cresols, on a hot surface by means of a doctor knife and heating the flowout at about 100° C. until dry. The solvent employed was n-butanol. A piece of transparent regenerated cellulose film of 0.001 inch thickness was then sandwiched between two pieces of the above polyamide film each of which had a thickness of 0.0014 inch, and the three films placed between two sections of clean glass plate approximately 0.1 inch in thickness. Lamination was then effected by applying a pressure of 600 lb./sq. in. at 160° C. and allowing the product to cool in the press. This gave a clear shatterproof laminated glass.

Example IV

A film of a 30% solution of the interpolymer mentioned in Example I in 98% formic acid was spread on two clean glass plates by means of a doctor knife and dried at 110° C. until substantially free of solvent. A transparent film of polyhexamethylene adipamide of 0.001 inch thickness prepared from a solution containing hydrogen chloride was then pressed between the two coated plates of glass at 160° C. under 700 lb./sq. in. pressure and cooled rapidly in the press. When this laminated glass was struck a sharp blow with a hammer, cracks developed but the laminated glass remained as a single strong sheet.

Example V

A double window was constructed of two pieces of plate glass with a sealed air space between them. Glass strips were used for spacings on the four edges but all glass to glass contacts were eliminated by placing strips of a polyamide film of 0.002 inch thickness, prepared from diphenylolpropane diacetic acid

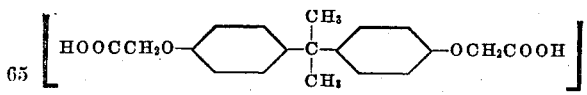

and decamethylenediamine, and having an intrinsic viscosity of 0.6 on each side of the spacer strips, heating to 100° C., pressing together, and then sealing the edges with molten polyamide.

Example VI

Test pieces consisting of seasoned hard maple chips of one inch width and 0.2 inch thickness were overlapped and in the one square inch of area common to the two was placed a square inch of polyamide sheet of 0.018 inch thickness prepared from the interpolymer mentioned in Example I. The pressed pieces were then subjected to 1600 lb. pressure at 145° C. for 30 minutes. A force of 1100 lb. was required to separate the two chips at 25° C. A similar test piece after soaking in water for five days at room temperature also had good strength.

Although this invention has been described with with particular reference to polyamides, it is applicable broadly to high viscosity synthetic linear condensation polymers. As examples of such polymers might be mentioned the polyesters, polyacetals, polyethers, polyester-polyamides, etc. described in my above mentioned application.

The foregoing examples are not to be considered as limitative but as illustrative of the products of this invention and methods for their preparation. Thus, other types of synthetic linear condensation polyamides can be employed in addition to those cited above. A valuable class of polyamides for the preparation of laminated articles are those derived from one or more diamines of formula $NH_2CH_2RCH_2NH_2$ and one or more dicarboxylic acids of formula $$HOOCCH_2R'CH_2COOH$$

or amide-forming derivatives thereof in which R and R' are divalent hydrocarbon radicals free from olefinic and acetylenic unsaturation and in which R has a chain length of at least two carbon atoms. An especially valuable group of polyamides within this broad class are those in which R is $(CH_2)_x$ and R' is $(CH_2)_y$ wherein $x$ is at least two. As examples of polyamides which fall within one or both of these groups might be mentioned polytetramethylene suberamide, polypentamethylene adipamide, polyhexamethylene adipamide, poly-3-methyl hexamethylene adipamide, polyhexamethylene beta-methyl adipamide, polyhexamethylene sebacamide, polyoctamethylene adipamide, polydecamethylene adipamide, polydecamethylene p-phenylene diacetamide, and poly-p-xylylene sebacamide, as well as copolymers derived from reactants of the types represented in these polyamides. High viscosity polyamides of the types disclosed in U. S. Patents 2,176,074, 2,158,064 and 2,174,619 can also be used. Polyamides derived from polymerizable monoamino-monocarboxylic acids or amide-forming derivatives thereof are also useful in the formation of laminated articles. As examples of polyamides of this type might be mentioned those derived from 6-aminocaproic acid, 9-aminononanoic acid, and 11-aminoundecanoic acid, as well as interpolymers derived from a mixture of polymerizable monoaminomonocarboxylic acids. Interpolymers derived from amino acids, diamines, and dibasic acids may also be employed. Mixtures of preformed polyamides are also suitable.

The film or interlayer used in the preparation of the laminated articles of this invention need not necessarily consist solely of polyamides. It is frequently desirable to use softening or plasticizing agents in conjunction with the polyamides. As examples of suitable plasticizers for this purpose might be mentioned o-hydroxydiphenyl, diphenylolpropane (Example II), and certain types of compatible resinous materials. The plasticizer tends to make the film more flexible and sometimes improves its adhesion to the glass. Frequently it improves the clarity of the films. Phenols are particularly useful in this connection. If a plasticizer is to be used, it is frequently advantageous to prepare the polyamide in the presence of the plasticizer.

While the use of clear transparent interlayers is essential in the preparation of safety glass for use in motor vehicles and the like, for certain applications it is advantageous that the interlayer be opaque. For the preparation of such articles it is often desirable to use polyamides containing dispersed therein products which are incompatible therewith, such as pigments, extenders, fillers, certain resins, dyes, or certain cellulose derivatives. Polyamides have a strong affinity for dyes so that colored laminated articles can be prepared by immersing the polyamide film in a suitable dye solution before applying it between the glass plates. It is also within the scope of this invention to prepare laminated articles containing as an interlayer some other film-forming material, such as a cellulosic material (Example III) or a resin, e. g., vinyl resins, polyvinyl alcohol-aldehyde condensation products, urea-formaldehyde resins, polymers of acrylic or methacrylic acid derivatives, etc., and uniting this film-forming material to the glass plates by means of a film or solution of the polyamide or uniting a polyamide film by means of the other material.

While laminated glass is usually prepared by laminating two or more plates of glass with the use of a suitable interlayer, a laminated glass may also be prepared by uniting a single sheet of glass to a reinforcing sheet of a suitable plastic material such as a cellulosic material by means of a film of a synthetic linear condensation polyamide. The polyamides are also useful in laminating such materials as wood, paper, cloth, leather, metals, sheets, metal foils, and the like. The laminae may be different; for example, a novel type of leather was made by laminating a sheet of tin foil with leather by means of a polyamide film. It is within the scope of this invention to unite a plurality of laminae. In preparing the laminated articles it is frequently advantageous to use polyamide films or sheets which have been subjected to stress in one or more directions to produce orientation therein. Thus, valuable interlayers can be prepared by subjecting polyamide films to stress in one direction and then uniting two such films crosswise, i. e., so that the orientation in the two films lies in different directions.

This invention provides a simple method for the preparation of laminated articles of great utility. Since polyamide films are exceedingly strong and have excellent bonding qualities, laminated articles prepared with a polyamide interlayer are characterized by great strength and durability. The great strength of polyamide interlayers coupled with their low density (approximately 1.1) makes it possible to use thinner and lighter interlayers than is possible in the case of the plastic materials previously described for this purpose. This is not only an economic advantage but also an advantage in utility, since it makes it possible to prepare the laminated articles of less weight. The laminated glass of this invention because of its great strength and non-shattering properties is useful in safety glass in motor vehicles, aeroplanes, etc. The invention is also useful in making burglar-proof glass. Another important application of this invention is in the preparation of double window glass.

As many apparently widely different embodiments of this invention may be made without departing from the spirit and scope thereof, it is to be understood that I do not limit myself to the specific embodiments thereof except as defined in the appended claims.

I claim:

1. A laminated product comprising at least two laminae bonded to an interlayer of synthetic linear condensation polymer, said polymer having an intrinsic viscosity of at least 0.4.

2. A laminated product comprising at least two transparent sheet material laminae bonded to an interlayer of synthetic linear condensation polymer, said polymer being one capable of being drawn into fibers which upon X-ray examination exhibit orientation along the fiber axis.

3. A laminated product comprising at least two sheets of glass bonded to an interlayer of synthetic linear condensation polymer, said polymer being one capable of being drawn into fibers which upon X-ray examination exhibit orientation along the fiber axis.

4. The product set forth in claim 1 in which said polymer is a polyamide.

5. The product set forth in claim 2 in which said polymer is a polyamide.

6. A laminated product comprising at least two laminae bonded to an interlayer comprising a film of polyamide obtainable by reacting at least one diamine of the formula $NH_2CH_2RCH_2NH_2$ and at least one compound of the class consisting of dicarboxylic acids of the formula $$HOOCCH_2R'CH_2COOH$$

and amide-forming derivatives of such reactants, R and R' being divalent hydrocarbon radicals free from olefinic and acetylenic unsaturation, and R having a chain length of at least two carbon atoms.

7. The product set forth in claim 3 in which said polymer is an interpolymer derived from a mixture of polyamide-forming reactants capable of forming at least two different polyamides.

8. The laminated product set forth in claim 3 in which said polymer is polyhexamethylene adipamide.

9. A laminated product comprising a sheet of glass having bonded thereto a sheet of synthetic linear condensation polymer, said polymer being one capable of being drawn into fibers which upon X-ray examination exhibit orientation along the fiber axis.

10. A laminated product comprising a sheet of glass having bonded thereto a sheet of synthetic linear polyamide, said polyamide being one capable of being drawn into fibers which upon X-ray examination exhibit orientation along the fiber axis.

11. A laminated product comprising a sheet of glass having bonded thereto a sheet of polyhexamethylene adipamide, said polyhexamethylene adipamide being one capable of being drawn into fibers which upon X-ray examination exhibit orientation along the fiber axis.

12. A double window glass comprising at least two sheets of glass having a sealed air space between and spaced by glass strips at the edges, said glass sheets and strips being bonded by a film of synthetic linear condensation polymer, said polymer being one capable of being drawn into fibers which upon X-ray examination exhibit orientation along the fiber axis.

13. The product set forth in claim 1 in which said polymer is a polyester-polyamide.

14. The product set forth in claim 3 in which said polymer is a polyester-polyamide.

WALLACE H. CAROTHERS.